(12) United States Patent
Walley

(10) Patent No.: US 9,606,682 B2
(45) Date of Patent: Mar. 28, 2017

(54) WEARABLE DEVICE FOR GENERATING CAPACITIVE INPUT

(71) Applicant: BROADCOM CORPORATION, Irvine, CA (US)

(72) Inventor: John Stuart Walley, Ladera Ranch, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/321,749

(22) Filed: Jul. 1, 2014

(65) Prior Publication Data

US 2015/0301644 A1  Oct. 22, 2015

Related U.S. Application Data

(60) Provisional application No. 61/982,289, filed on Apr. 21, 2014.

(51) Int. Cl.
*G06F 3/044* (2006.01)
*G06F 3/01* (2006.01)
(Continued)

(52) U.S. Cl.
CPC .............. *G06F 3/044* (2013.01); *G06F 1/163* (2013.01); *G06F 3/011* (2013.01); *G06F 3/0383* (2013.01);
(Continued)

(58) Field of Classification Search
CPC ........ G06F 3/044; G06F 3/011; G06F 3/0383; G06F 2203/0382; G06F 2203/04108
See application file for complete search history.

(56) References Cited

U.S. PATENT DOCUMENTS 5,796,827 A * 8/1998 Coppersmith ....... A61B 5/0024
380/265
5,963,199 A * 10/1999 Kato ..................... G06F 3/0488
345/156

(Continued)

FOREIGN PATENT DOCUMENTS

EP 0109184 A2 5/1984
EP 2620839 A2 7/2013
WO WO-2013/136119 A1 9/2013

OTHER PUBLICATIONS

Song, et al, "Signal Transmission in a Human Body Medium-Based Body Sensor Network Using a Mach-Zehnder Electro-Optical Sensor", Sensors 2012, ISSN 1424-8220, Nov. 30, 2012, pp. 16557-16570.

(Continued)

*Primary Examiner* — Ilana Spar
*Assistant Examiner* — Mihir K Rayan
(74) *Attorney, Agent, or Firm* — McDermott Will & Emery LLP

(57) ABSTRACT

A wearable device for generating capacitive input may include a signal generator, a transmitter, and at least one transmission electrode. The at least one transmission electrode may be configured to be communicatively coupled to a first location on a surface of a body. The signal generator may be configured to generate an electrical signal. The transmitter may be configured to transmit the electrical signal to the surface of the body via the at least one electrode, such that the electrical signal is detectable by a capacitive sensor upon exiting the body. In one or more implementations, the wearable device may further include at least one ground electrode that is configured to provide a (Continued)

ground return and to be communicatively coupled to a second location on the surface of the body that is different than the first location.

20 Claims, 7 Drawing Sheets

(51) Int. Cl.
    *G06F 3/038*     (2013.01)
    *G06F 3/0354*     (2013.01)
    *G06F 1/16*     (2006.01)
    *H04B 13/00*     (2006.01)

(52) U.S. Cl.
    CPC ....... *G06F 3/03545* (2013.01); *H04B 13/005* (2013.01); *G06F 2203/0382* (2013.01); *G06F 2203/04108* (2013.01)

(56) References Cited

U.S. PATENT DOCUMENTS

| | | | | |
|---|---|---|---|---|
| 6,223,018 B1* | 4/2001 | Fukumoto | ................ | H04B 5/00 379/55.1 |
| 6,441,721 B1* | 8/2002 | Tajima | ................ | G07C 9/00111 340/286.01 |
| 6,545,614 B1* | 4/2003 | Kasai | ................ | H03K 17/962 341/33 |
| 6,771,161 B1* | 8/2004 | Doi | ................ | B60R 25/2027 340/10.34 |
| 7,171,177 B2* | 1/2007 | Park | ................ | H04B 13/005 340/573.1 |
| 7,668,122 B2* | 2/2010 | Sung | ................ | H04B 13/005 370/280 |
| 7,725,089 B2* | 5/2010 | Lee | ................ | H04B 5/0012 340/573.1 |
| 8,098,129 B2* | 1/2012 | Falck | ................ | G07C 9/00087 340/5.53 |
| 8,224,244 B2* | 7/2012 | Kim | ................ | H04B 13/005 340/13.22 |
| 8,634,773 B2* | 1/2014 | Meskens | ................ | A61B 5/0028 455/41.2 |
| 2008/0158158 A1* | 7/2008 | Cheah | ................ | G06F 3/0317 345/166 |
| 2009/0187824 A1* | 7/2009 | Hinckley | ................ | G06F 3/04883 715/711 |
| 2010/0277435 A1 | 11/2010 | Han et al. | | |
| 2011/0227856 A1 | 9/2011 | Corroy et al. | | |
| 2012/0113051 A1 | 5/2012 | Bird et al. | | |
| 2013/0050131 A1* | 2/2013 | Lee | ................ | G08G 1/09626 345/174 |
| 2013/0141384 A1* | 6/2013 | Mukherjee | ................ | G06F 3/0416 345/174 |
| 2013/0324089 A1* | 12/2013 | Kim | ................ | G06F 21/32 455/411 |
| 2014/0049478 A1* | 2/2014 | Brunet | ................ | G06F 3/0416 345/173 |

OTHER PUBLICATIONS

European Office Action dated Dec. 23, 2016, which issued in European Application No. 15001067.6.

* cited by examiner

WEARABLE DEVICE FOR GENERATING CAPACITIVE INPUT

CROSS-REFERENCE TO RELATED APPLICATIONS

The present application claims the benefit of U.S. Provisional Patent Application Ser. No. 61/982,289, entitled "Wearable Device for Generating Capacitive Input," filed on Apr. 21, 2014, which is hereby incorporated by reference in its entirety entireties for all purposes.

TECHNICAL FIELD

The present description relates generally to a wearable device, and a wearable device for generating capacitive input.

BACKGROUND

Capacitive sensors take human body capacitance as input. For example, tablet or mobile devices may use capacitive touchscreens as input devices for detecting a human finger. Electronic devices, such as televisions, may also use capacitive sensors in place of mechanical buttons. Passive styli that are conductive may be used with capacitive touchscreens, e.g. in place of, or in addition to, a human finger; however, the use of a passive stylus may not provide any additional input functionality than the use of a human finger. An active stylus may be configured to transmit electrical signals to, and/or receive electrical signals from, a capacitive touchscreen, e.g. via a built-in digitizer. Thus, an active stylus may be able to provide advanced input functionality over a passive stylus, such as by providing a hover mode where the active stylus can be detected by a capacitive touchscreen while hovering over, but not touching, the capacitive touchscreen.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject wearable device for generating capacitive input may be attached to the body of a person, such as in the form of a watch, a bracelet, a ring, or generally any device that may be positioned at least partially in contact with the surface of the body of a person. The wearable device may generate and transmit an electrical signal that propagates along the surface of, and/or through, the body of the person and emanates from a finger of the person such that the electrical signal is detectable by a capacitive touchscreen of an electronic device, and/or other capacitive sensing devices, with or without the finger touching the capacitive touchscreen. In this manner, the wearable device allows the person to use their finger as an active stylus, rather than having to hold a separate physical active stylus.

The wearable device may generate and transmit a signal that propagates along and/or through the skin and/or body of the person that is wearing the wearable device. The signal may be generated by a signal generator that capacitively couples an electric field through the skin and/or body of the person. The wearable device may include one or more transmission electrodes (or plates), and/or a ground electrode (or ground plate), for transmitting/receiving signals through the body of the person. The generated signal may be a single frequency signal, e.g. from the range of 6-10 MHz, or the signal may be a combination of multiple different frequencies from the same band, e.g. to provide a broadband signal. In one or more implementations, the wearable device may modulate data onto a carrier of the generated signal, e.g. to provide data transfer capabilities. In one or more implementations, the electrical signals emanating from each finger may have different capacitive signatures such that the signals can be individually detected as separate capacitive inputs.

Figure 1:
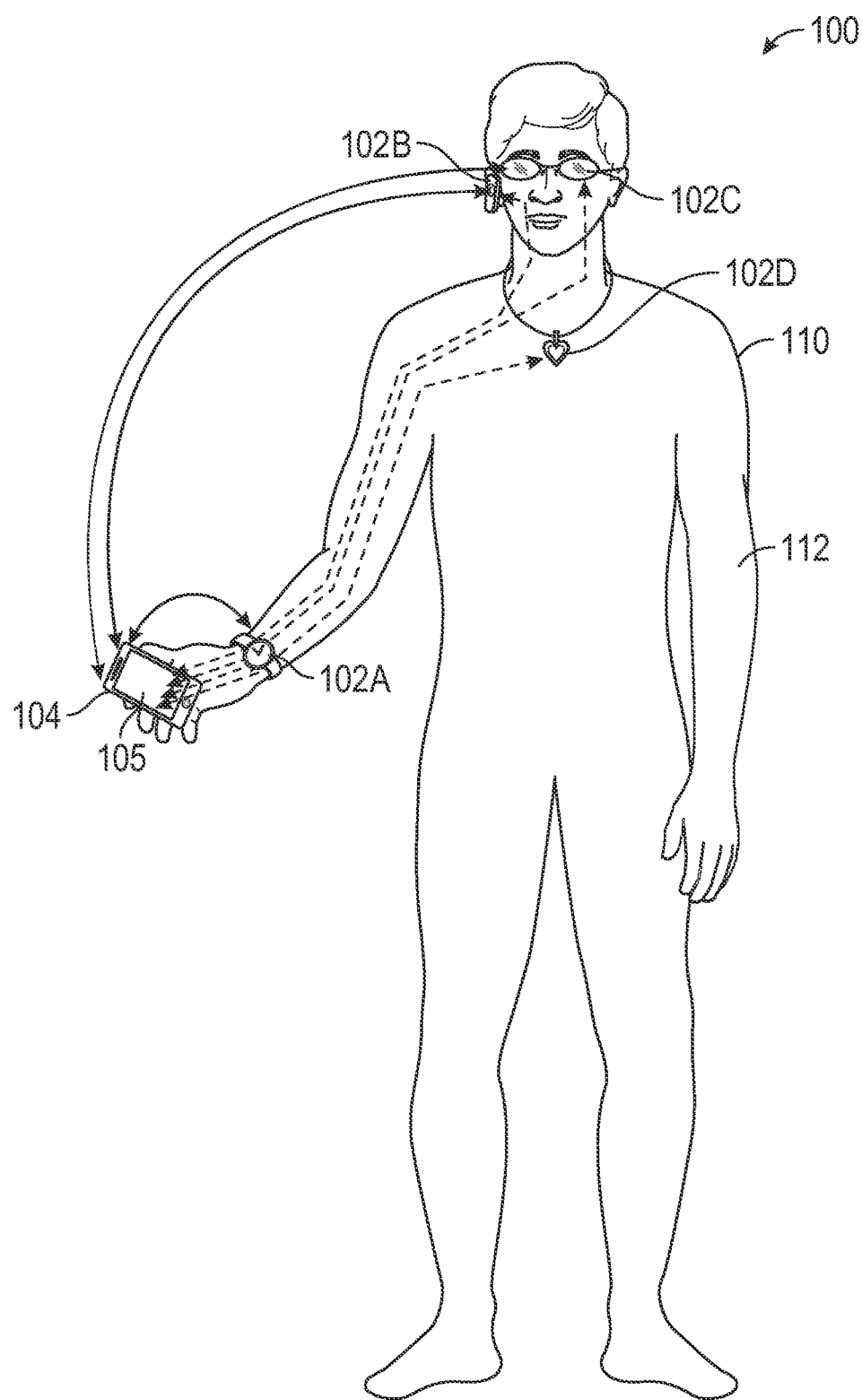
FIG. 1 illustrates an example body area network environment that may implement one or more wearable devices for generating capacitive input in accordance with one or more implementations.

FIG. 1 illustrates an example body area network environment 100 that may implement one or more wearable devices for generating capacitive input in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The body area network environment 100 includes a body 110, e.g. of a person, one or more wearable devices 102A-D, and an electronic device 104. The body 110 of the person may include a surface 112, such as skin and/or one or more pieces of clothing through, or along, which an electrical signal may propagate. The body 110 may include a head, a neck, a torso, one or more limbs, such as arms, fingers, and/or legs, or generally any body parts. The wearable devices 102A-D may be attached and/or affixed adjacent to the body 110, and/or generally at least a portion of each of the wearable devices 102A-D may be touching the surface 112, e.g. skin, of the body 110. The electronic device 104 may include one or more capacitive sensing devices 105, such as a capacitive touchscreen and/or one or more capacitive sensors.

In FIG. 1, the wearable device 102A is depicted as a smart watch device, the wearable device 102B is depicted as an earpiece device, the wearable device 102C is depicted as a smart glasses device, and the wearable device 102D is depicted as a necklace device. However, the wearable devices 102A-D are not limited to the examples depicted in FIG. 1, and the wearable devices 102A-D may be any device that can be positioned adjacent to the surface 112 of the body 110. An example wearable device 102A is discussed further below with respect to FIGS. 2, 3, 5, and 6. In one or more implementations, the electronic device 104 may be, or may include, a mobile device that includes a capacitive touchscreen, a tablet device that includes a capacitive touchscreen, or generally any device that includes one or more capacitive sensing devices 105, such as one or more capacitive sensors that, e.g., collectively form a capacitive touchscreen. An example electronic device 104 is discussed further below with respect to FIG. 4. One or more of the wearable devices 102A-D and/or the electronic device 104 may be, and/or may include all or part of, the electronic system illustrated in FIG. 7.

One or more of the wearable devices 102A-D, such as the wearable device 102A may generate and transmit electrical signals that propagate through the body 110, and/or along the surface 112 of the body 110. The electrical signals generated by the wearable device 102A may emanate from multiple fingers of the body 110 and/or multiple regions of a hand of the body 110. In this manner, the one or more capacitive sensing devices 105, such as in the form of a capacitive touchscreen, may identify hand gestures, e.g. through recognition of a heat map generated by the signals emanating from the hand of the body 110. Further in this regard, the electronic device 104 may be able to identify multiple points of contact on the one or more capacitive sensing devices 105, such as multiple fingers of the body 110 touching or hovering over the capacitive sensing devices 105, as opposed to a physical active stylus that may only provide for a single point of contact and/or a single point of hover. In one or more implementations, if multiple wearable devices 102A-D are transmitting electrical signals, the wearable devices 102A-D may implement a frequency division multiplexing scheme, a time division multiplexing scheme, or any other scheme that can mitigate and/or prevent interference between signals transmitted by the wearable devices 102A-D. The frequencies of operation assigned to the wearable devices 102A-D may be calibrated at an initial power and/or pairing stage.

In one or more implementations, the one or more capacitive sensing devices 105 of the electronic device 104 may be further configured to differentiate between electrical signals emanating from different fingers and/or different hands of the body 110, e.g. through recognition of a capacitive signature associated with the signals emanating from each finger of each hand and/or through the use of devices, e.g. sensors, affixed to the fingernails of the fingers. For example, devices affixed to the fingernails of the fingers may intercept signals transmitted by one or more of the wearable devices 102A-D and may adjust the phase and/or frequency of the electrical signals before they emanate out of the fingers, e.g. such that the electrical signals emanating out of each finger have a unique frequency and/or phase. In one or more implementations, one or more of the fingers may wear separate wearable devices 102A-D that transmit distinct electrical signals, e.g. distinct phases and/or distinct frequencies. In one or more implementations, the electronic device 104 may perform an initial calibration with the wearable device 102A for each of the fingers, and the electronic device 104 may then store a capacitive signature associated with each of the fingers that may be used to differentiate each of the fingers. In one or more implementations, the capacitive signatures of the fingers may also be used for user authentication purposes, such as via finger recognition and/or whole or partial hand map recognition.

In one or more implementations, one or more of the wearable devices 102A-D, such as the wearable devices 102A-C in FIG. 1, may be communicatively coupled to the electronic device 104 via a wireless link, such as via a Bluetooth low energy (BLE) link. The wireless link may be used by the electronic device 104 as a control channel and/or to perform one or more closed loop feedback functions, such as to detect the presence of one or more of the wearable devices 102A-C, to initiate transmission of an electrical signal by one or more of the wearable devices 102A-C, to transmit security information, to calibrate the electrical signal transmission of one or more of the wearable devices 102A-C, such as by selecting a frequency of operation tailored to the surface 112 of the body 110, and the like.

In one or more implementations, one or more of the wearable devices 102A-D may include a receiver for receiving electrical signals generated and transmitted by the electronic device 104. The electrical signals transmitted by the electronic device 104 may propagate through the body 110, along the surface 112 of the body 110, and/or through the air to the body 110, e.g. when at least a portion of the body 110 is touching the electronic device 104 and/or is proximal to the electronic device 104. The electronic device 104 may transmit the electrical signals, for example, using capacitive and/or inductive coupling via one or more electrodes and/or plates integrated and/or attached to the enclosure of the electronic device 104. The electrical signals may propagate through the body 110 and/or along the surface 112 of the body 110, to one or more of the wearable devices 102A-D, such as the wearable device 102A. The wearable device 102A may receive the electrical signal, and, if the electrical signal is modulated, may demodulate the electrical signal to recover data for further processing.

In one or more implementations, electrical signals transmitted from the electronic device 104 to the wearable device 102A might serve, for example, as a locator of the proximity of the wearable device 102A to the body 110 and/or the surface 112 of the body 110, and/or to perform one or more of the aforementioned the closed loop feedback functions, e.g. in lieu of and/or in addition to the wireless link. In one or more implementations, the electronic device 104 may also transmit electrical signals to detect whether the surface 112 of the body 110, e.g. a hand surface, is touching the electronic device 104, such as for hand recognition, user identification and/or a secure pairing with one or more of the wearable devices 102A-D.

In one or more implementations, when multiple communication links are available between the electronic device 104 and one or more of the wearable devices 102A-D, e.g. a wireless link, a capacitively coupled link, etc., the electronic device 104 and/or one or more of the wireless devices 102A-D may communicate over multiple links and/or may select a communication link based on one or more environmental attributes that may affect the quality of one or more of the links, such as a number of proximal wireless devices transmitting over a same and/or similar frequency.

Figure 2:
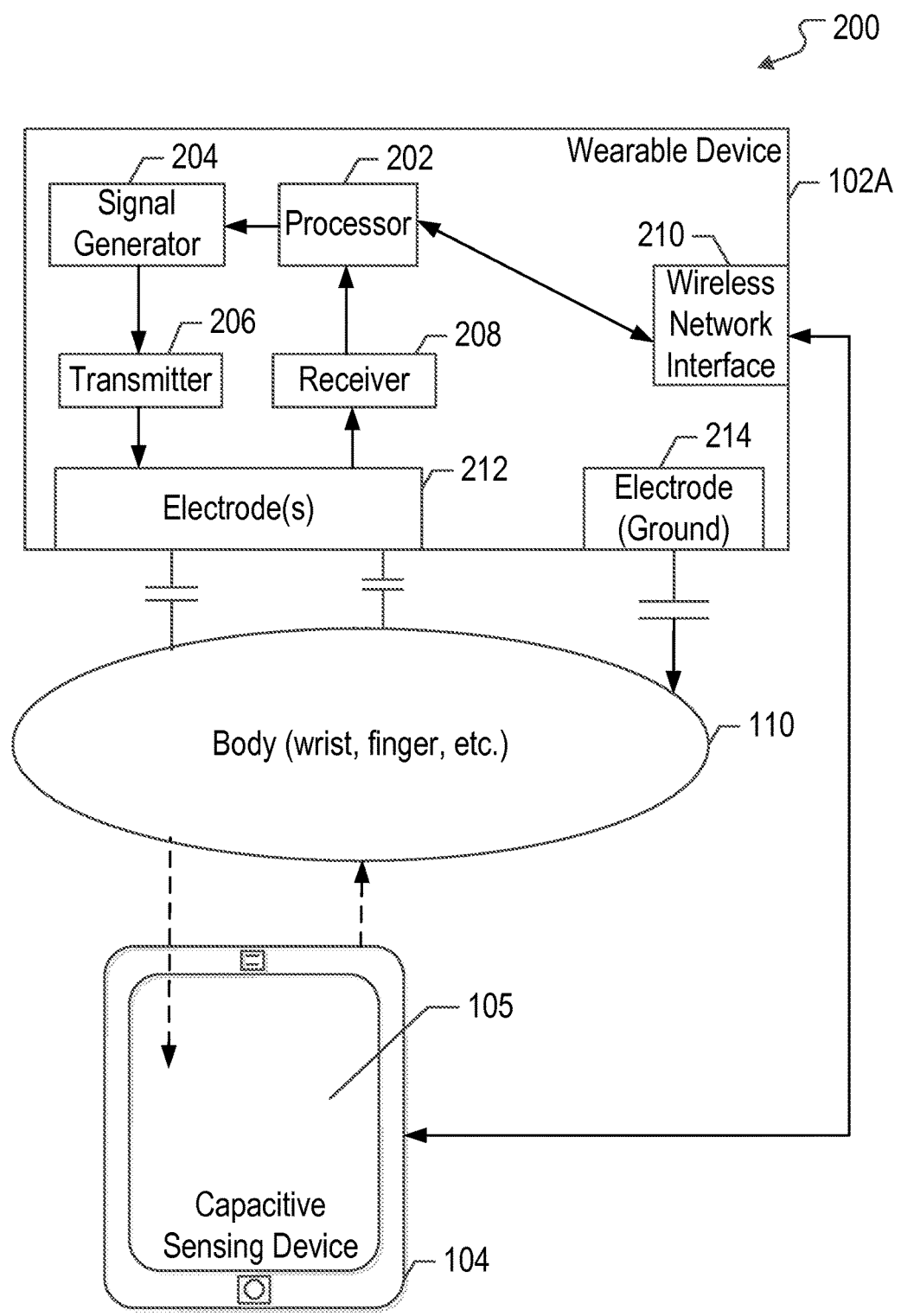
FIG. 2 illustrates an example body area network environment that includes an example wearable device for generating capacitive input in accordance with one or more implementations.

FIG. 2 illustrates an example body area network environment 200 that includes an example wearable device 102A for generating capacitive input in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example body area network environment 200 includes the wearable device 102A, the body 110, and the electronic device 104. For explanatory purposes, the wearable device illustrated in FIG. 2 is depicted as the wearable device 102A of FIG. 1. However, the wearable device illustrated in FIG. 2 may also be, or may include all or part of, one or more of the other wearable devices 102B-D of FIG. 1, or any other wearable device. The wearable device 102A includes a processor 202, a signal generator 204, a transmitter 206, a receiver 208, a wireless network interface 210, one or more transmission electrodes 212, and one or more ground electrodes 214. The one or more transmission electrodes 212 and/or the one or more ground electrodes 214 may be touching, and/or adjacent to, the body 110, e.g. touching the surface 112 of the body 110. The electronic device 104 includes the one or more capacitive sensing devices 105, such as in the form of a capacitive touchscreen.

The transmitter 206 of the wearable device 102A may include a modulator for modulating data onto a generated signal, and the receiver 208 of the wearable device 102A may include a demodulator for demodulating a received signal to recover data. In one or more implementations, the electronic device 104 may also include a transmitter and receiver. The wireless network interface 210 may support one or more wireless communication protocols, such as Bluetooth, BLE, WiFi, near-field communication (NFC), infra-red, or generally any wireless communication protocol. In one or more implementations, the receiver 208 of the wearable device 102A and/or a receiver of the electronic device 104 may be designed and/or configured with a particular level of sensitivity. The level of sensitivity of the receiver 208 of the wearable device 102A and/or the receiver of the electronic device 104 may be used to determine the power level and/or voltage level used for signals transmitted by the transmitter of the electronic device 104 and/or the transmitter 206 of the wearable device 102A.

In one or more implementations, the wearable device 102A and the electronic device 104 may discover and/or pair with one another over a wireless link, e.g. via the wireless network interface 210 of the wearable device 102A. The wearable device 102A and the electronic device 104 may then calibrate one or more transmission characteristics of transmitted signals, such as frequency, phase, power level, etc., over the wireless link. As part of the calibration process, the wearable device 102A may transmit one or more electrical signals to the electronic device 104 as calibration signals and the electronic device 104 may provide feedback to the wearable device 102A with respect to the quality of the received signals, and vice-versa. In this manner, the wearable device 102A and/or the electronic device 104 can adapt and/or adjust the transmission characteristics of the transmitted signals based at least on the received feedback.

The wearable device 102A may subsequently receive instructions from the electronic device 104 via the wireless network interface 210, such as an instruction to begin transmitting an electrical signal, an instruction to stop transmitting an electrical signal, etc. In response to receiving an instruction to begin transmitting an electrical signal, the signal generator 204 may generate the electrical signal, e.g. using the calibrated power level, frequency, etc. If modulation is being used, the transmitter 206 may modulate data onto a carrier of the electrical signal, and the signal may then be capacitively coupled to the body 110, and/or the surface 112 of the body 110, using the one or more transmission electrodes 212 and/or the ground electrode 214, such as through the use of differential signaling. The transmitted signal may propagate along the body 110 and/or the surface 112 of the body 110 and may emanate out of a finger and/or hand of the body 110. Upon exiting the body 110, the signal may be detected by the one or more capacitive sensing devices 105 of the electronic device 104. The electronic device 104 may then perform an action in response to detecting the signal, e.g. in a similar manner that the electronic device 104 would respond to detecting input from an active stylus.

In one or more implementations, the electronic device 104 may transmit a capacitively coupled electrical signal back to the wearable device 102A with or without modulated data. The signal may pass through the one or more transmission electrodes 212 and/or the ground electrode 214 and may be received by the receiver 208. The receiver 208 may demodulate the received signal, if the received signal includes modulated data, and may then provide an indication of the received signal, along with any recovered data, to the processor 202. In one or more implementations, in response to receiving a capacitively coupled signal from the electronic device 104, the processor 202 may initiate transmission of a wireless signal to the electronic device 104 via the wireless network interface 210, e.g. to confirm that the capacitively coupled signal was received by the wearable device 102A, and thereby confirming that the wearable device 102A is touching the body 110 of the person.

In one or more implementations, one or more of the processor 202, the signal generator 204, the transmitter 206, the receiver 208, and the wireless network interface 210 may be implemented in software (e.g., subroutines and code). In one or more implementations, one or more of the processor 202, the signal generator 204, the transmitter 206, the receiver 208, the wireless network interface 210, and the one or more capacitive sensing devices 105 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
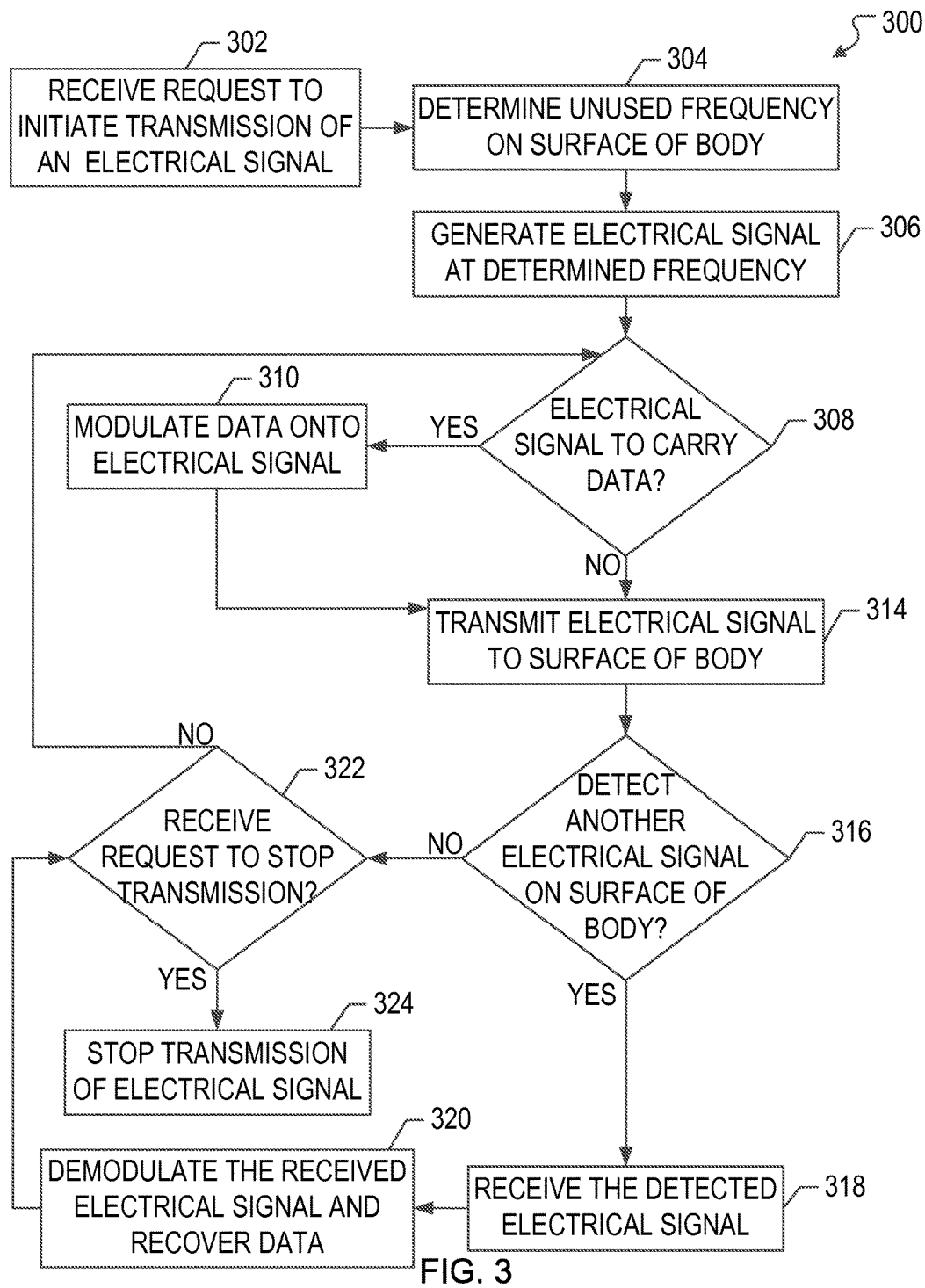
FIG. 3 illustrates a flow diagram of an example process of a wearable device for generating capacitive input in accordance with one or more implementations.

FIG. 3 illustrates a flow diagram of an example process 300 of a wearable device 102A for generating capacitive input in accordance with one or more implementations. For explanatory purposes, the example process 300 is primarily described herein with reference to components of the wearable device 102A of FIGS. 1 and 2; however, the example process 300 is not limited to the wearable device 102A of FIGS. 1 and 2, and the example process 300 may be performed by one or more of the other wearable devices 102B-D and/or other components of the wearable device 102A. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The wearable device 102A receives a request to initiate transmission of an electrical signal (302). For example, the electronic device 104 may discover, and/or pair, with the wearable device 102A via a wireless communication protocol, such as a Bluetooth, WiFi, or generally any wireless communication protocol. The electronic device 104 may then use the wireless communication protocol to transmit the request to initiate the transmission of the electrical signal to the wearable device 102A.

In response to receiving the request, the wearable device 102A determines an unused frequency on the surface 112 of the body 110 (304). In one or more implementations, the wearable device 102A may determine an unused frequency by performing a calibration with the electronic device 104 that includes sweeping a set of frequencies to identify a suitable frequency or range. In one or more implementations, the wearable device 102A may attempt to identify the presence of other signals that may be propagating along the surface 112 of the body 110, and may avoid using the same frequencies as any such signals. In one or more implementations, the wearable device 102A may perform the frequency determination as part of a calibration process with the electronic device 104 that may be performed before receiving a request to initiate transmission of an electrical signal.

Once the wearable device 102A determines a suitable frequency, the signal generator 204 of the wearable device 102A generates an electrical signal at the determined frequency (306). If the electrical signal will be carrying data (308), a carrier of the electrical signal is modulated with data, e.g. by a modulator of the transmitter 206 (310), and the transmitter 206 of the wearable device 102A transmits the electrical signal to the surface 112 of the body 110, e.g. by capacitively coupling the signal to the surface 112 of the body 110 using the one or more transmission electrodes 212 and/or the ground electrode 214 (314). If the electrical signal will not be carrying data (308), the transmitter 206 of the wearable device 102A transmits the electrical signal to the surface 112 of the body 110 (314).

The wearable device 102A may also attempt to detect the presence of electrical signals on the surface 112 of the body 110 that have transmission characteristics, e.g. frequency, phase, etc., that are associated with a transmitter of the electronic device 104, e.g. as determined during a calibration process with the electronic device 104 (316). If the wearable device 102A detects a signal on the surface 112 of the body 110 that has the transmission characteristics associated with the transmitter of the electronic device 104 (316), the receiver 208 of the wearable device 102A may receive the detected electrical signal, e.g. via the one or more transmission electrodes 212 and/or the ground electrode 214 (318). The receiver 208 may then demodulate the received signal (if the signal is modulated), and recover any data modulated on the signal (320). The receiver 208 may provide an indication of the received signal, along with any recovered data, to the processor 202.

If the wearable device 102A receives a request to stop the transmission of the electrical signal (322), the wearable device 102A stops the transmission of the electrical signal (324). Otherwise, the wearable device 102A may continuously perform steps (308)-(314) until receiving a request to stop transmission. In one or more implementations, the wearable device 102A may receive a request to stop transmission over a wireless link, e.g. via the wireless network interface 210, and/or in the form of data modulated on an electrical signal transmitted by the electronic device 104.

Figure 4:
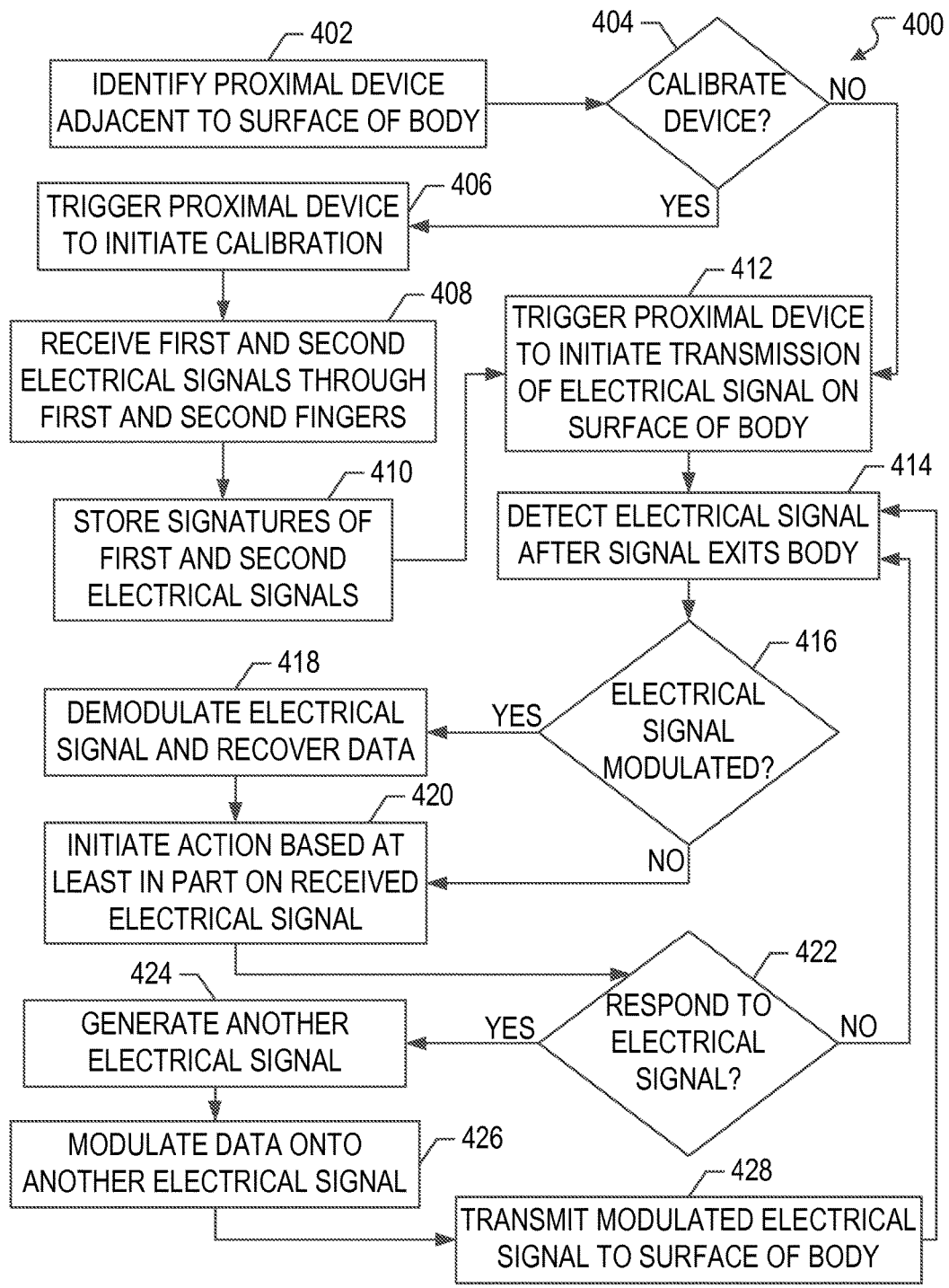
FIG. 4 illustrates a flow diagram of an example process of an electronic device that includes one or more capacitive sensing devices in accordance with one or more implementations.

FIG. 4 illustrates a flow diagram of an example process 400 of an electronic device 104 that includes one or more capacitive sensing devices 105 in accordance with one or more implementations. For explanatory purposes, the example process 400 is primarily described herein with reference to electronic device 104 of FIGS. 1 and 2; however, the example process 400 is not limited to the electronic device 104 of FIGS. 1 and 2, and the example process 400 may be performed by one or more components of the electronic device 104. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The electronic device 104 identifies a proximal device that is adjacent to the surface 112 of the body 110, such as the wearable device 102A (402). For example, the electronic device 104 may discover the wearable device 102A using a wireless communication protocol, such as Bluetooth, WiFi, or generally any wireless communication protocol. In one or more implementations, after discovering the wearable device 102A, the electronic device 104 may connect to, and/or pair with, the wearable device 102A via the wireless communication protocol.

Upon discovering the wearable device 102A (402), the electronic device 104 determines whether to calibrate electrical signal transmissions with the wearable device 102A (404). For example, if the electronic device 104 has not performed a calibration process with the wearable device 102A, and/or if one or more environmental attributes have changed since the last calibration process was performed with the wearable device 102A, the electronic device 104 may determine that a calibration process should be performed with the wearable device 102A. If the electronic device 104 determines that a calibration process should be performed with the wearable device 102A (404), the electronic device 104 triggers the wearable device 102A to initiate the calibration process, such as by transmitting an instruction to the wearable device 102A via a wireless link (406). The wearable device 102A may initiate the calibration process by generating and transmitting a calibration electrical signal to the surface 112 of the body 110. The electronic device 104 may calibrate appropriate transmission characteristics with the wearable device 102A, e.g. via the wireless link.

In one or more implementations, the electronic device 104 may include a display that is configured to provide instructions to a user during the calibration process. The electronic device 104 may instruct the user to touch the capacitive sensing device 105 using a first finger, and the electronic device 104 may receive and/or measure a first electrical signal emanating from the first finger (408). The electronic device 104 may then instruct the user to touch the capacitive sensing device 105 using a second finger, and the electronic device 104 may receive and/or measure a second electrical signal emanating from the second finger (408). The electronic device 104 may perform the calibration (408) for any number of fingers.

The electronic device 104 stores the capacitive signatures of the first and second electrical signals along with an indication of the associated first and second fingers (410), and then the electronic device 104 triggers the wearable device 102A to initiate transmission of an electrical signal to the surface 112 of the body 110 (412). When the user's hand and/or finger is near, and/or touching, the one or more capacitive sensing devices 105 of the electronic device 104, the one or more capacitive sensing devices 105 of the electronic device 104 detect the electrical signal emanating from the hand and/or finger (414). The capacitive sensing devices 105 may be configured to detect whether the hand and/or finger is touching the capacitive sensing devices 105 or hovering over the one or more capacitive sensing devices 105. In one or more implementations, the capacitive sensing devices 105 may detect the electrical signal emanating from the hand and/or finger as if the hand and/or finger were an active stylus. If the electrical signal is modulated (416), the electronic device 104 demodulates the electrical signal and recovers the modulated data (418).

The electronic device 104 may initiate an action, such as any touch or gesture associated action, based at least in part on the received signal (420). In one or more implementations, the electronic device 104 may determine a positional attribute of the body 110, e.g. the hand or fingers of the body, associated with the received signal. The positional attribute may indicate the portion of the body 110, e.g. hand, finger(s), etc., associated with the received signal, and whether the portion of the body 110 was hovering over the one or more capacitive sensing devices 105 and/or touching the one or more capacitive sensing devices 105. For example, the electronic device 104 may determine the capacitive signature of the received signal and may determine if the capacitive signature is mapped to a particular finger. If the capacitive signature is mapped to a particular finger, the electronic device 104 may perform an action associated with the particular finger. In one or more implementations, the electronic device 104 may perform a different action depending on whether the finger of the user is touching the one or more capacitive sensing devices 105 of the electronic device 104 at the time that the electrical signal is received. In one or more implementations, the electronic device 104 may map different actions to finger touches of different fingers, to finger hovers of different fingers, to different gestures of different fingers, to finger hover/touch/gesture of multiple fingers simultaneously, etc.

The electronic device 104 determines whether to transmit a response to the wearable device 102A, such as an acknowledgement that the electrical signal was received (422). If the electronic device 104 determines that a response to the electrical signal should be transmitted (422), the electronic device generates an electrical signal (424) and may, in one or more implementations, modulate data onto the electrical signal (426). The electronic device 104 then transmits the electrical signal to the surface 112 of the body 110, e.g. by capacitively coupling the signal to the surface 112 of the body 110 (428). The electronic device 104 may continue to detect for electrical signals emanating from the hand and/or finger of the user (414), e.g. until the wearable device 102A is no longer in proximity of the electronic device 104 and/or until the electrical signal transmission is stopped.

Figure 5:
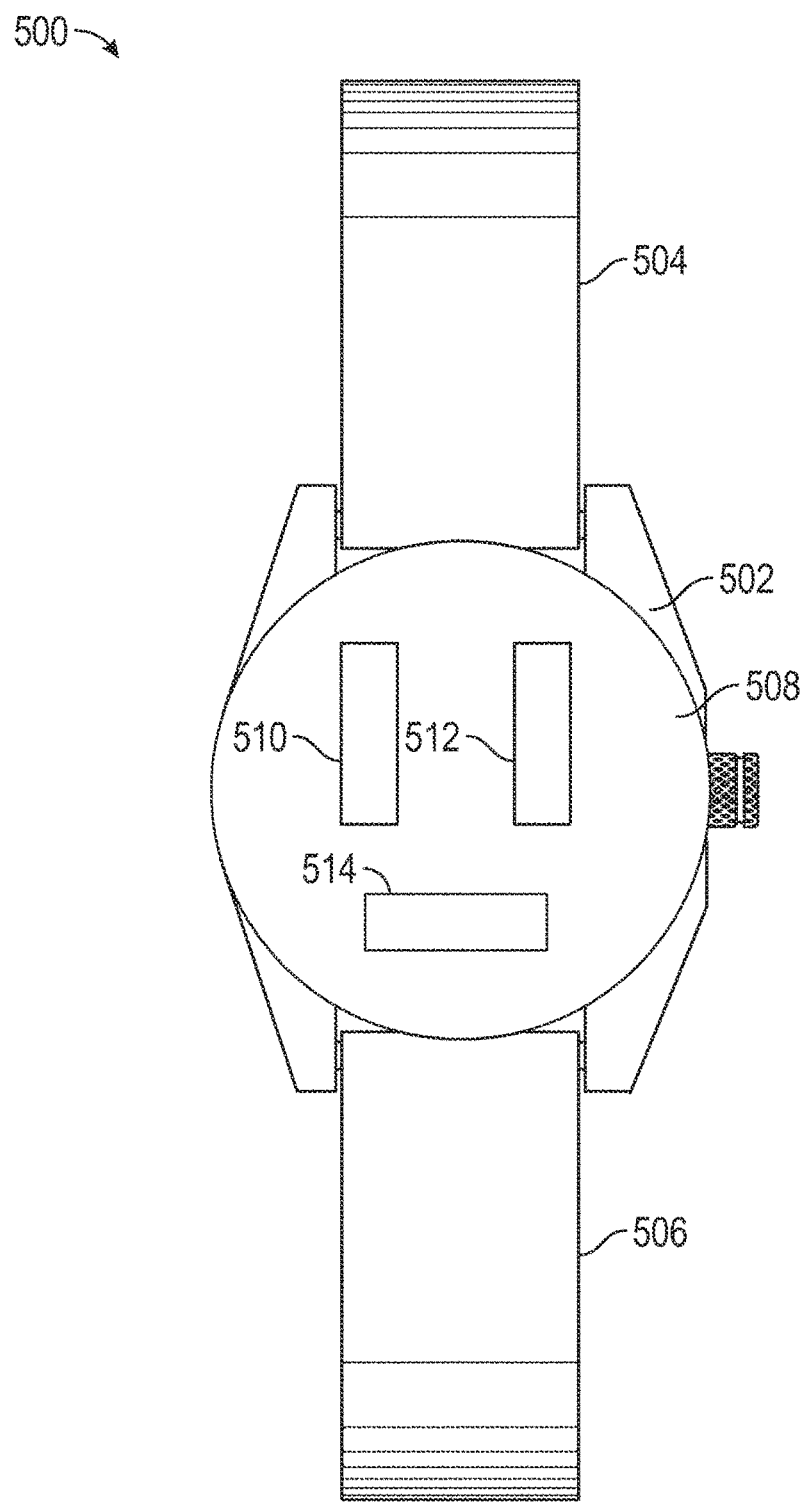
FIG. 5 illustrates an example wearable device for generating capacitive input in accordance with one or more implementations.

FIG. 5 illustrates an example wearable device 500 for generating capacitive input in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

In one or more implementations, the example wearable device 500 illustrated in FIG. 5 may be, or may include all or part of, one or more of the other wearable devices 102A-D of FIG. 1. The example wearable device 500 includes an enclosure 502, a first strap portion 504, and a second strap portion 506. In one or more implementations, the enclosure 502 of the wearable device 500 may be referred to as a body portion of the wearable device 500. The enclosure 502 may include a surface 508 that is adjacent to, and/or touching, the surface 112 of the body 110 of a person, e.g. the skin of the body 110. The enclosure 502 may include one or more additional surfaces (not shown) that do not touch, and/or are not adjacent to, the surface 112 of the body 110 of the person. The surface 508 includes a first transmission electrode 510, a second transmission electrode 512, and a ground electrode 514. In one or more implementations, the first transmission electrode 510 and/or the second transmission electrode 512 may be the one or more transmission electrodes 212 illustrated in FIG. 2. In one or more implementations, the ground electrode 514 may be the ground electrode 214 illustrated in FIG. 2. In one or more implementations, the wearable device 102A may include only one of the first transmission electrode 510 or the second transmission electrode 512.

In one or more implementations, a single ended configuration may be realized through the arrangement of a single transmission electrode 510 and a single ground electrode 514. In one or more implementations, a differential signal configuration may be realized through the arrangement of two transmission electrodes 510 and 512 along with a ground electrode 514. In one or more implementations, the differential signal configuration may be less prone to noise effects in the transmission path, and may also provide a higher signal to noise ratio, than the single ended configuration. In one or more implementations, the single ended configuration may provide for a simpler design, e.g. with fewer electrodes that need to be touching the surface 112 of the body 110.

Figure 6:
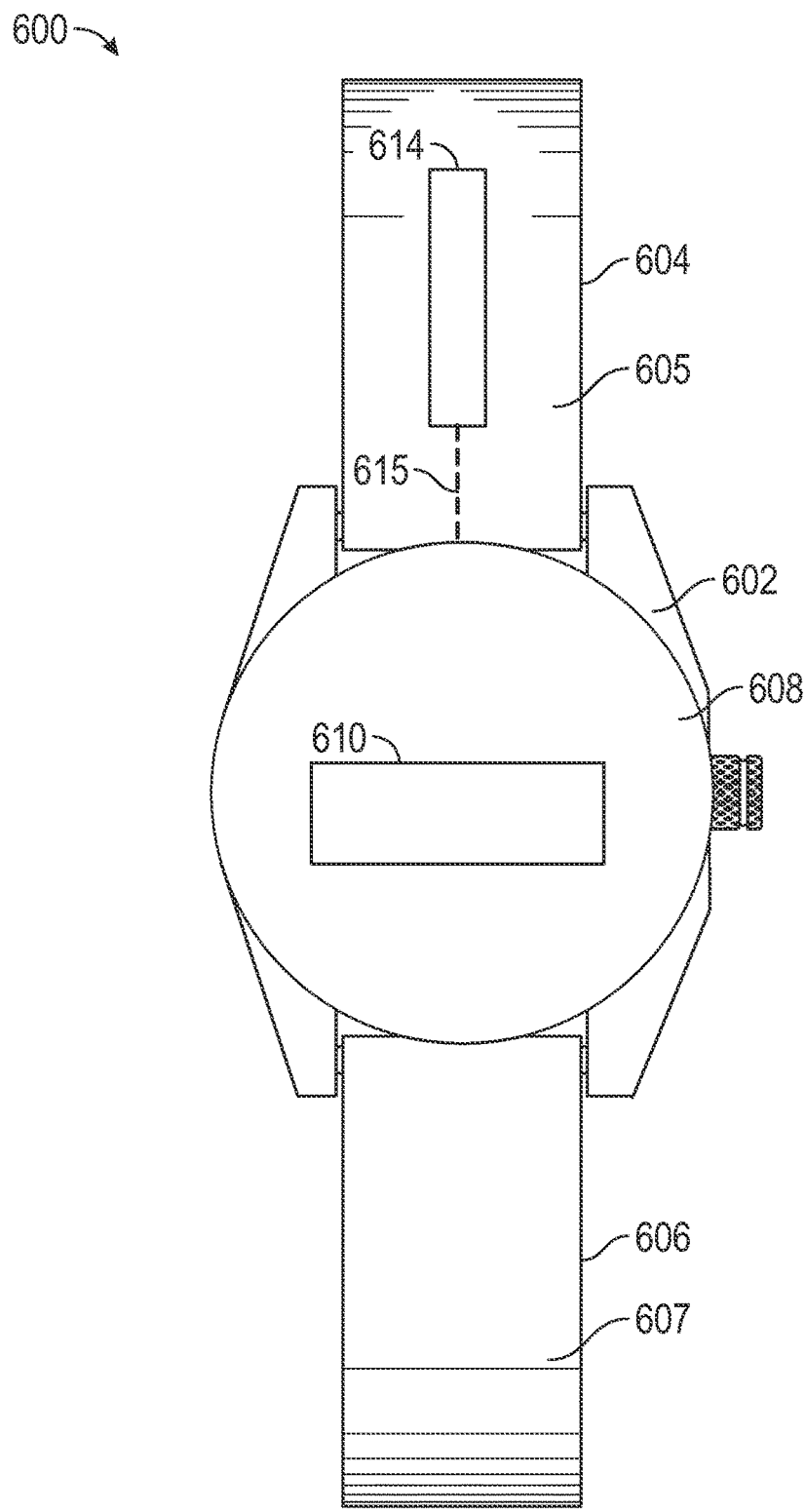
FIG. 6 illustrates an example wearable device for generating capacitive input in accordance with one or more implementations.

FIG. 6 illustrates an example wearable device 600 for generating capacitive input in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

In one or more implementations, the example wearable device 600 illustrated in FIG. 6 may be, or may include all or part of, one or more of the other wearable devices 102A-D of FIG. 1. The example wearable device 600 includes an enclosure 602, a first strap portion 604, and a second strap portion 606. In one or more implementations, the enclosure 602 of the wearable device 600 may be referred to as a body portion of the wearable device 600. The enclosure 602 may include a surface 608 that is adjacent to, and/or touching, the surface 112 of the body 110 of a person, e.g. the skin of the body 110. The enclosure 602 may include one or more additional surfaces (not shown) that do not touch, and/or are not adjacent to, the surface 112 of the body 110 of the person. The first strap portion 604 may include a surface 605 that is adjacent to, and/or touching, the body 110 of a person, e.g. the skin of the body 110. The second strap portion 606 may include a surface 607 that is adjacent to, and/or touching, the surface 112 of the body 110 of a person, e.g. the skin of the body 110. The first and second strap portions 604, 606 may include one or more additional surfaces (not shown) that do not touch, and/or are not adjacent to, the body 110 of the person.

The surface 608 of the enclosure 602 includes a transmission electrode 610, such as the one or more transmission electrodes 212 illustrated in FIG. 2. The surface 605 of the first strap portion 604 includes a ground electrode 614, such as the ground electrode 214 illustrated in FIG. 2. The first strap portion 604 may further include a transmission line 615 that communicably couples and/or electrically couples, the ground electrode 614 to the enclosure 602, the surface 608 of the enclosure 602, and/or to the transmission electrode 610. In one or more implementations, the surface 608 of the enclosure 602 may include another transmission electrode (not shown) and/or another ground electrode (not shown). In one or more implementations, the transmission electrode 610 may be on the surface 605 of the first strap portion 604 and the ground electrode 614 may be on the surface 608 of the enclosure 602. In one or more implementations, one or more of the transmission electrode 610 and/or the ground electrode 614 may be on the surface 607 of the second strap portion 606.

The arrangement the ground electrode 614 on the first strap portion 604, which is separated by the body 110 of the user from the transmission electrode 610 on the surface 608 of the enclosure 602, may provide a path for a return signal with possibly less interference than, e.g., the arrangement of the one or more transmission electrodes 510, 512, and the ground electrode 514 discussed with respect to FIG. 5.

Figure 7:
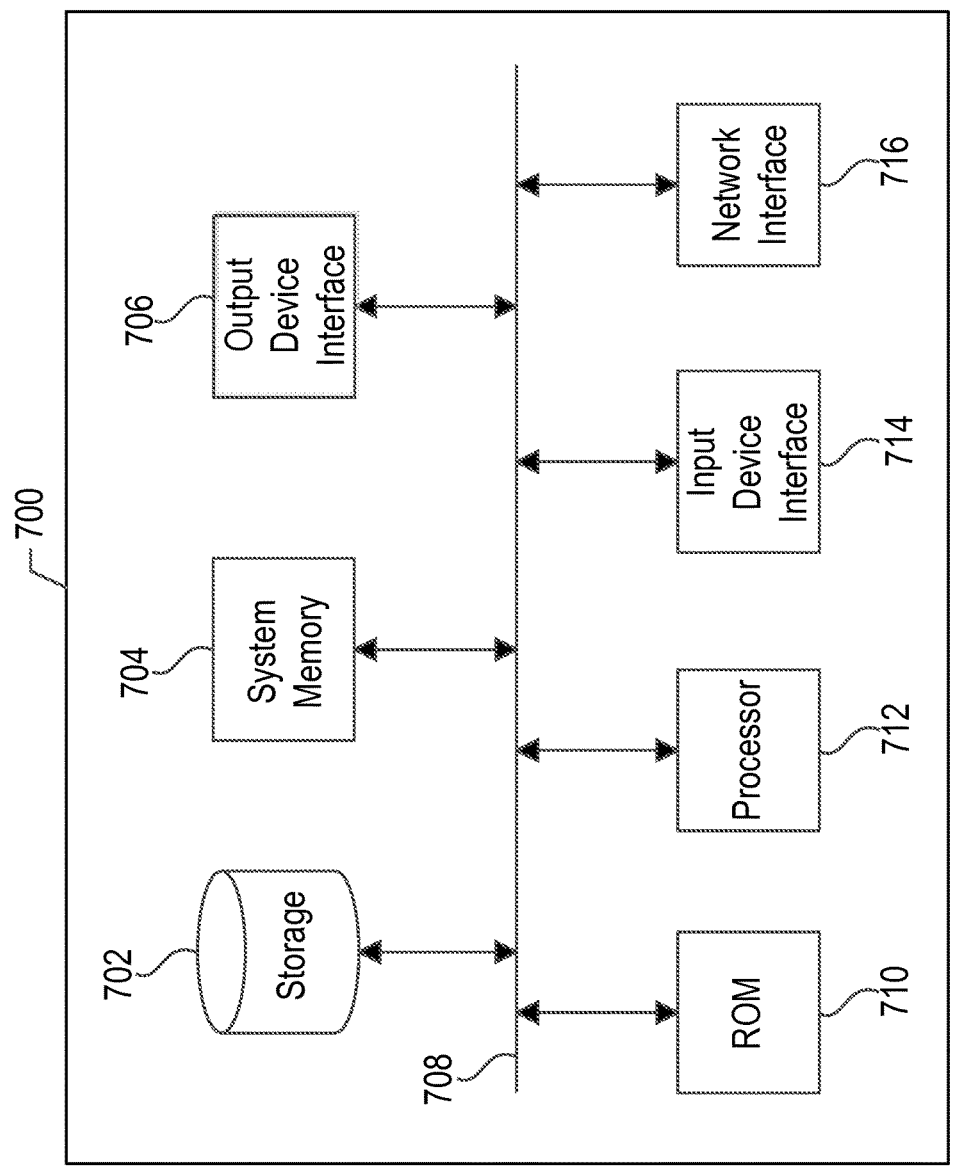
FIG. 7 conceptually illustrates an example electronic system with which one or more implementations of the subject technology can be implemented.

FIG. 7 conceptually illustrates an example electronic system 700 with which one or more implementations of the subject technology can be implemented. The electronic system 700, for example, may be, or may include, one or more wearable devices, such as one or more of the wearable devices 102A-D, a capacitive sensing device, such as the capacitive sensing device 105 of the electronic device 104, a desktop computer, a laptop computer, a tablet computer, a phone, a personal digital assistant (PDA), and/or generally any electronic device. Such an electronic system 700 includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, one or more network interface(s) 716, and/or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are utilized by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory (RAM). The system memory 704 may store one or more of the instructions and/or data that the one or more processing unit(s) 712 may utilize at runtime. In one or more implementations, the processes of the subject disclosure are stored in the system memory 704, the permanent storage device 702, and/or the ROM 710. From these various memory units, the one or more processing unit(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, bus 708 also couples electronic system 700 to one or more networks (not shown) through one or more network interface(s) 716. The one or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 700 can be a part of one or more networks of computers (such as a local area network (LAN), a wide area network (WAN), or an Intranet, or a network of networks, such as the Internet. Any or all components of electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A wearable device comprising:
   at least one electrode that is configured to be communicatively coupled to a first location on a surface of a body;
   a signal generator that is configured to generate an electrical signal; and
   a transmitter that is configured to transmit the electrical signal to the surface of the body via the at least one electrode, wherein the electrical signal is detectable by a capacitive sensor upon exiting the body, wherein, when the surface of the body is nonadjacent to the capacitive sensor, the electrical signal is detectable by the capacitive sensor distinct from a detection of the surface of the body when the surface of the body is adjacent to the capacitive sensor, and the surface of the body is distinctly identifiable from other surfaces of the body based at least in part on comparing at least one measurement of the detected electrical signal to a pre-stored measurement associated with the electrical signal exiting the surface of the body.

2. The wearable device of claim 1, wherein the electrical signal causes an electronic device comprising the capacitive sensor to perform an action when the electrical signal is detected by the capacitive sensor.

3. The wearable device of claim 1, further comprising:
   at least one ground electrode that is configured to provide a ground return and to be communicatively coupled to a second location on the surface of the body that is different than the first location.

4. The wearable device of claim 1, further comprising:
   a modulator that is configured to modulate data onto a carrier of the electrical signal prior to transmission of the electrical signal.

5. The wearable device of claim 1, further comprising:
   a receiver that is configured to receive another electrical signal via the at least one electrode; and
   a demodulator that is configured to demodulate a carrier of the another electrical signal to recover data from the another electrical signal.

6. The wearable device of claim 1, further comprising:
   a body portion that comprises the at least one electrode.

7. The wearable device of claim 6, further comprising:
   a strap portion that comprises at least one ground electrode, wherein the at least one ground electrode provides a ground return.

8. A computer program product comprising instructions stored in a non-transitory computer-readable storage medium, the instructions comprising:
   instructions to identify a proximal device that is adjacent to a surface of a body;
   instructions to trigger the proximal device to initiate transmission of an electrical signal through the body;
   instructions to detect, via at least one capacitive sensor, the electrical signal after the electrical signal has exited the body, wherein when the surface of the body is nonadjacent to the at least one capacitive sensor, the electrical signal is detectable by the at least one capacitive sensor separately from a detection of the surface of the body when the surface of the body is adjacent to the at least one capacitive sensor;
   instructions to identify the surface of the body distinctly from other surfaces of the body based at least in part on comparing at least one measurement of the detected electrical signal to a pre-stored measurement associated with the electrical signal passing through the body and exiting the surface of the body; and
   instructions to initiate an action based at least in part on detecting the electrical signal.

9. The computer program product of claim 8, wherein the instructions for identifying the proximal device that is adjacent to the surface of the body further comprise:
   instructions to identify the proximal device via a wireless communication protocol.

10. The computer program product of claim 9, wherein the instructions for triggering the proximal device to initiate the transmission of the electrical signal through the body further comprises:
    instructions to trigger the proximal device, via the wireless communication protocol, to initiate the transmission of the electrical signal through the body.

11. The computer program product of claim 9, further comprising:
    instructions to determine a positional attribute of the body based at least in part on the detected electrical signal.

12. The computer program product of claim 11, wherein the positional attribute comprises at least one of a hand gesture, a finger gesture, a finger touch, or a finger hover.

13. The computer program product of claim 11, wherein the instructions further comprise:
    instructions to initiate a calibration of the proximal device;
    instructions to receive the electrical signal through a first touch of a first finger of a plurality of fingers of the body;
    instructions to receive the electrical signal through a second touch of a second finger the plurality of fingers of the body; and
    instructions to store a first signature of the electrical signal received through the first touch and a second signature of the electrical signal received through the second touch.

14. The computer program product of claim 13, wherein the positional attribute comprises a finger touch of one of the plurality of fingers and the instructions further comprise:
    instructions to identify the one of the plurality of fingers as the first finger or the second finger based at least in part on the first signature or the second signature.

15. The computer program product of claim 8, wherein the instructions further comprise:

instructions to demodulate a carrier of the electrical signal to recover data from the electrical signal.

16. The computer program product of claim 8, wherein the instructions further comprise:
instructions to generate another electrical signal;
instructions to modulate data onto a carrier of the another electrical signal; and
instructions to transmit the modulated another electrical signal to the body, wherein the modulated another electrical signal is receivable by the proximal device via the body.

17. The computer program product of claim 8, wherein the action comprises modifying a user interface that is being displayed.

18. A method for providing input to a capacitive sensor, the method comprising:
generating, by a signal generator circuit, an electrical signal that is detectable by a capacitive sensor of an electronic device; and
passing the electrical signal through at least a portion of a body of a person, wherein the electrical signal causes an action to be initiated by the electronic device when detected by the capacitive sensor of the electronic device, wherein when a surface of the body is nonadjacent to the capacitive sensor, the electrical signal exiting the at least the portion of the body of the person is detectable by the capacitive sensor separately from a detection of the surface of the body of the person when the surface of the body of the person is adjacent to the capacitive sensor, and the surface of the body is distinctly identifiable from other surfaces of the body based at least in part on comparing at least one measurement of the detected electrical signal to stored measurement associated with the electrical signal exiting the surface of the body.

19. The method of claim 18, further comprising:
detecting the electrical signal by the capacitive sensor of the electronic device after the electrical signal exits the body; and
initiating the action based at least in part on the detecting.

20. The method of claim 18, further comprising:
modulating data onto a carrier of the electrical signal prior to passing the electrical signal through the at least the portion of the body of the person.

* * * * *